US011813139B2

(12) United States Patent
Thomé et al.

(10) Patent No.: US 11,813,139 B2
(45) Date of Patent: Nov. 14, 2023

(54) ZYGOMATIC IMPLANT WITH PARTIALLY INTERRUPTED THREADED PORTION

(71) Applicant: JJGC INDÚSTRIA E COMÉRCIO DE MATERIAIS DENTÁRIOS S.A., Curitiba (BR)

(72) Inventors: Geninho Thomé, Curitiba (BR); Felix Andreas Mertin, Curitiba (BR); Tiago Nunes De Queiroz, Campo Largo (BR)

(73) Assignee: JJGC INDÚSTRIA E COMÉRCIO DE MATERIAIS DENTÁRIOS S.A., Curitiba (BR)

( * ) Notice: Subject to any disclaimer, the term of this patent is extended or adjusted under 35 U.S.C. 154(b) by 71 days.

(21) Appl. No.: 17/424,518

(22) PCT Filed: Apr. 5, 2019

(86) PCT No.: PCT/BR2019/050125
§ 371 (c)(1),
(2) Date: Jul. 21, 2021

(87) PCT Pub. No.: WO2020/150795
PCT Pub. Date: Jul. 30, 2020

(65) Prior Publication Data
US 2022/0133444 A1    May 5, 2022

(30) Foreign Application Priority Data

Jan. 21, 2019  (BR) ............. 2020190011330

(51) Int. Cl.
*A61C 8/00*     (2006.01)
(52) U.S. Cl.
CPC ............ *A61C 8/0034* (2013.01); *A61C 8/006* (2013.01); *A61C 8/0022* (2013.01); *A61C 8/0071* (2013.01)

(58) Field of Classification Search
CPC ....... A61C 8/00; A61C 8/0018; A61C 8/0022; A61C 8/0034; A61C 8/0037; A61C 8/006; A61C 8/0071
See application file for complete search history.

(56) References Cited

U.S. PATENT DOCUMENTS 9,125,708 B2 * 9/2015 Carvalho ............. A61C 8/0018
10,292,793 B2 * 5/2019 Blackbeard .......... A61C 8/0089
(Continued)

FOREIGN PATENT DOCUMENTS

CN    217611492 U  * 10/2022  ............... A61C 8/00

OTHER PUBLICATIONS

Zou Duohong, Cn217611492 U English translation, 2023, Description (Year: 2023).*

Primary Examiner — Cris L. Rodriguez
Assistant Examiner — Kylie M. Gaspar
(74) Attorney, Agent, or Firm — Oliff PLC (57) ABSTRACT

An implant includes an elongated and cylindrical body; conical apical region coated by a screw thread and with at least three helical chambers and semi-spherical end; and a cervical region defined by a smooth cervical surface. The elongated and cylindrical body includes at least one longitudinal strip having a substantially smooth surface. The smooth longitudinal strip is located in the zygomatic implant cervical portion. The connection between the screw threads and the smooth longitudinal strip is made by a transition curvature, and the smooth longitudinal strip is aligned with one of the flat sides of the internal area with hexagonal cross section of the implant prosthetic interface.

13 Claims, 9 Drawing Sheets

(56) References Cited

U.S. PATENT DOCUMENTS

| | | | |
|---|---|---|---|
| 2002/0031474 A1* | 3/2002 | Carter | A61K 49/006 424/9.1 |
| 2012/0077151 A1* | 3/2012 | Nary Filho | A61C 8/006 433/174 |
| 2012/0178048 A1* | 7/2012 | Cottrell | A61C 8/0025 433/174 |
| 2012/0264085 A1* | 10/2012 | Hansson | A61C 8/0022 433/174 |
| 2014/0302458 A1* | 10/2014 | Towse | A61C 8/006 703/1 |
| 2016/0008103 A1* | 1/2016 | Tsai | A61C 8/0066 433/174 |
| 2017/0049539 A1* | 2/2017 | Jacoby | A61C 8/0037 |
| 2019/0254781 A1* | 8/2019 | Aparicio | A61C 8/0034 |
| 2020/0078146 A1* | 3/2020 | Jacoby | A61C 8/0018 |
| 2021/0236247 A1* | 8/2021 | Mendes Caramês | A61C 8/0034 |
| 2021/0282903 A1* | 9/2021 | Fischer | A61C 8/0034 |

\* cited by examiner (STATE OF THE ART)

FIG. 1.1

(STATE OF THE ART)

FIG. 1.2

(STATE OF THE ART)

FIG. 2

(STATE OF THE ART)

FIG. 3

(STATE OF THE ART)

FIG. 4

(STATE OF THE ART)

SECTION A-A
FIG. 13

(STATE OF THE ART)

SECTION B-B
FIG. 14

FIG. 15

ZYGOMATIC IMPLANT WITH PARTIALLY INTERRUPTED THREADED PORTION

The present utility model refers to a dental device, more precisely an implant designed to provide support to multiple prostheses used to replace maxillary teeth missing from a patient. More specifically, the present utility model concerns a zygomatic implant that was developed with the objective of providing better installation conditions, greater mechanical stability, and greater comfort during use, when compared to similar ones known in the current state of the art.

RELATED ART

As is known to PHOSITAs, dental implants are osseointegrated components produced with biocompatible materials (for example: titanium and zirconia, among others), which are inserted/anchored in bone tissue which they end up integrating over time. The installation of such implants will be successful if it promotes suitable primary and secondary stability, in that: (i) primary stability represents the implant/bone set mechanical stability, which, if achieved at the time of implant installation, can enable the immediate placement of the prosthesis (a technique called immediate loading), and (ii) secondary stability represents the stability obtained by suitable osseointegration of the implant after a certain period of time.

In the specific case of zygomatic implants, they are medical devices employed for multiple dental prostheses fixation—usually protocols—in patients with severe bone loss in the maxilla region. It should be noted that, under these conditions, the alternative to the use of zygomatic implants is to perform an existing bone graft, which requires a series of complex procedures, in addition to incurring a longer treatment time until actual installation of the prosthesis.

However, differently from what happens with conventional implants, zygomatic implants are installed with double anchorage, the proximal being made in the remaining maxillary bone of the patient, and the apical in the zygomatic bone of the face—which forms part of the eye socket.

Figure 11:
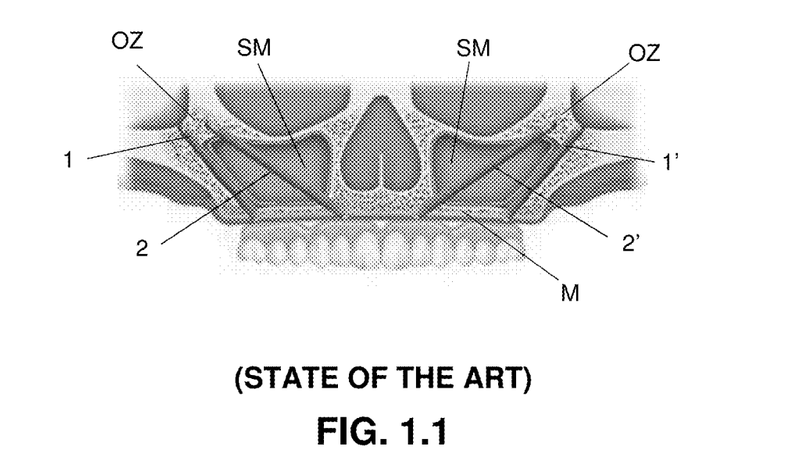
Figure 12:
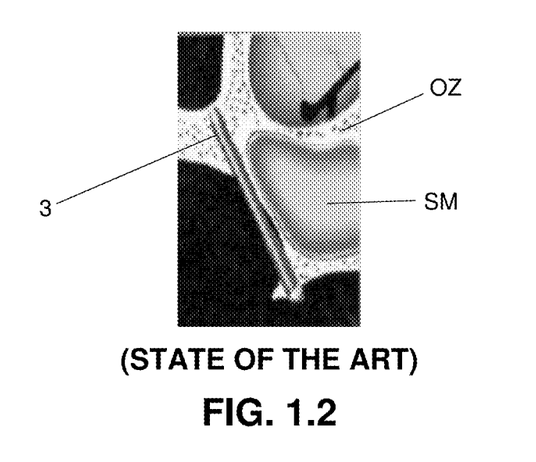

FIGS. 1.1 and 1.2 show examples of zygomatic anchorage in which it is possible to observe that a cavity commonly known as the maxillary sinus (SM) is located between the maxilla (M) and the zygomatic bone (OZ). Therefore, the apical portion of the implant is inserted in the zygomatic bone, while the cervical portion thereof remains inserted in the remaining maxillary bone/alveolar ridge after installation. The implant intermediate portion, however, can be embedded in the bone as occurs with the implants 1 and 1' of the appended FIG. 1.1, pass through the maxillary sinus as occurs with implants 2 and 2' of said figure, or be external to the zygomatic bone as occurs with implant 3 of FIG. 1.2, this technique being known as external installation.

Figure 2:
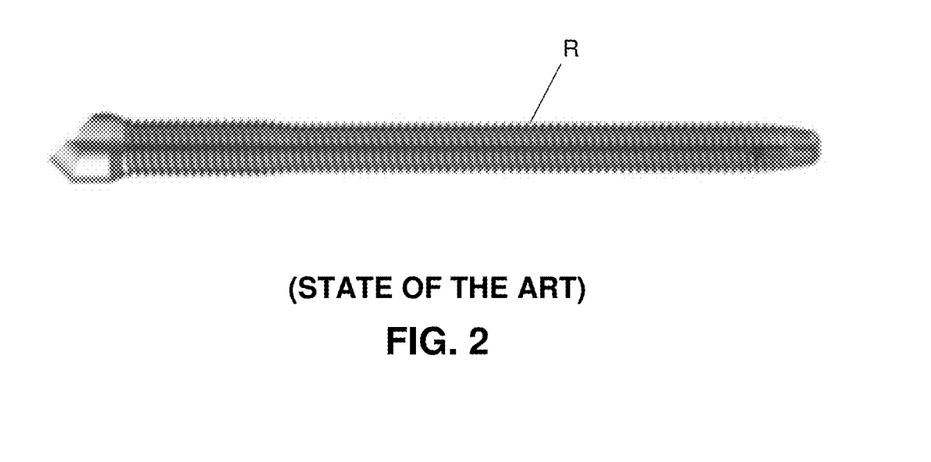
FIG. 2—an isolated view of a state of the art zygomatic implant, which is provided with a screw thread throughout its entire body.

Conventional zygomatic implants comprise screw threads (R) that cover the entirety of its body, as shown in the appended FIG. 2. However, it occurs that, mainly in cases where the external installation technique is used (in which part of the implant is outside the bone structure), after the end of the procedure the screw thread (R) of the body intermediate portion that crosses the maxillary sinus ends up directly interacting with the soft tissues of the face, which can cause tissue irritation and/or inflammation. Additionally, the patient is able to feel the implant screw thread whenever, for whatever reason, his face is touched or pressed in the region of the maxillary sinus, which can be significantly uncomfortable.

Figure 3:
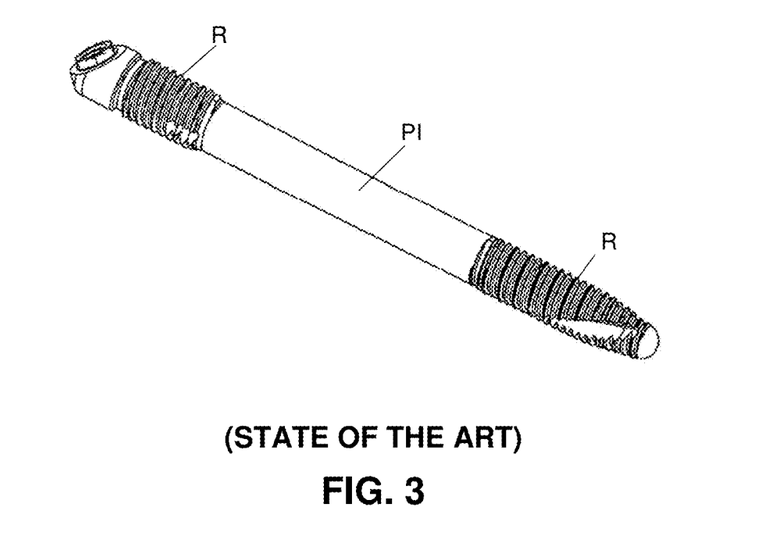
FIG. 3—a perspective view of another current state of the art implant, which has the medial region of its body smooth and devoid of screw threads.

In an attempt to reduce such inconveniences, zygomatic implants having different external features have been disclosed, such as, for example, the one revealed in document BRMU9101211-2 (FIG. 3), which presents an intermediate portion (PI) having an entirely smooth and polished perimeter to increase comfort and, also, to prevent bacteria fixation, since the surface roughness is inferior to their size. In this case, the screw threads are located in the implant cervical and apical regions.

Document U.S. Pat. No. 5,564,926 also describes an implant having a medial portion without a screw thread, whose body consists of two cylindrical segments having distinct cross sections, the distal portion—which is installed in the zygomatic bone—having a smaller diameter than the part proximal portion.

It is observed that both in the implant of document BRMU9101211-2 and in that described in document U.S. Pat. No. 5,564,926, after passing the threaded apical portion through the maxillary bone orifice, due to the existence of the smooth surface, the insertion is continued by simply pressing the implant towards the direction of installation; however, during this process, biasing of the correct implant axial direction may occur, due to the mobility provided by the absence of a screw thread in its intermediate portion, which may hinder the immediate preformed hole location in the zygoma and, therefore, hinder installation. Additionally, eventual implant apex positioning and installation inaccuracies in the zygomatic bone may cause the cervical screw thread to end up unduly widening the maxillary bone orifice, compromising the suitable primary stability of its final arrangement.

Figure 4:
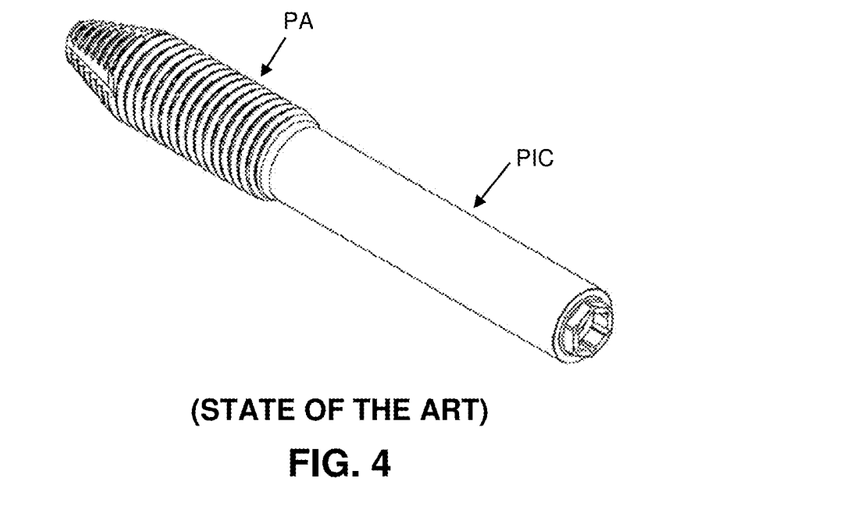
FIG. 4—another perspective view of a current state of the art implant, provided with a screw thread only in its apical portion and with the rest of its body (in the medial and cervical regions) completely smooth and devoid of screw thread.

The implant disclosed in document US9.125.708—which can be produced in metallic or ceramic material—has an apical portion (PA) threaded with a conical end (see appended FIG. 4) in order to facilitate the implant identification and penetration in an orifice preformed in the zygoma with the aid of a drill. The implant intermediate and cervical portions (PIC), on the other hand, have a totally smooth surface and a diameter equal to or less than the threaded portion diameter, the objective of the smooth surface being to avoid the occurrence of irritation or damage to the adjacent soft tissue. However, when the implant threaded apical portion diameter is greater than the diameter of the cervical region, a small gap will appear in the mandibular hole in relation to the implant smooth portion, a fact that in addition to the total absence of screw thread in the implant cervical region ends up compromising the suitable and desirable installation primary stability.

Figure 5:
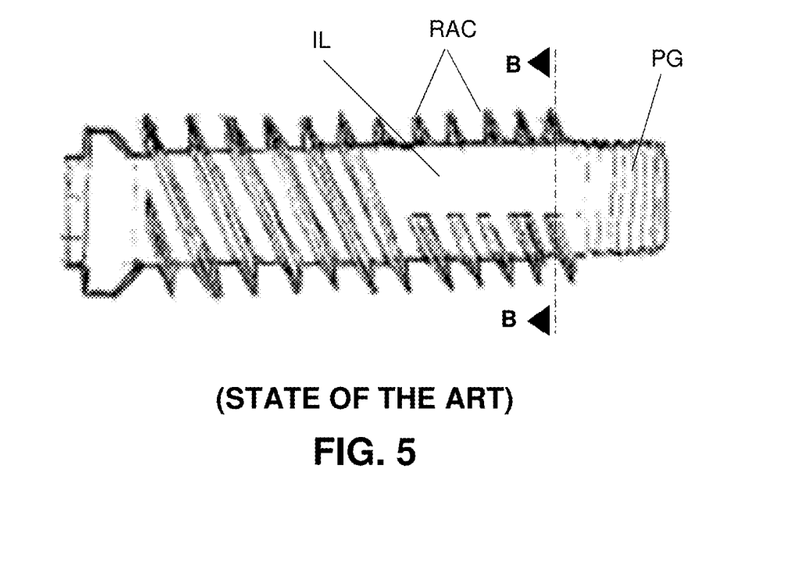
FIG. 5—a lateral view of another current state of the art implant, which shows a longitudinal interruption in its body's apical region, delimited by tapered and cutting threads.

The implant disclosed in document WO2011/063958 (illustrated in the appended FIG. 5) has a blunt and substantially smooth cylindrical shape "guide portion" (PG)—since it can be provided with microscopic structures to facilitate osseointegration—at the apical end, which acts as a simple guide for the initial insertion of the implant in the bone in order to prevent installation biasing. It is, therefore, an implant indicated for cases that demand a high degree of positioning accuracy. After this guide portion (PG), the implant is provided with self-cutting screw threads (RAC) to allow the implant installation and fixation in the bone base, the screw threads self-cutting characteristic being due to a longitudinal interruption (IL) that said screw threads present in the implant mid-apical portion, since such interruption allows the forming of tapered extremities that assist in the bone cutting during rotation for its installation. Therefore, said interrupted screw threads region of the implant must always be located in its apical portion to ensure that the first unique screw threads are self-cutting (RAC) in order to allow the installation of the part and its adequate fixation in the bone.

The use of an implant having such configuration for fixation to the zygomatic bone can also cause significant posterior discomfort to the patient, mainly due to the fact that the self-cutting screw threads (RAC) are tapered in the extremities that delimit the longitudinal interruption (IL) which can be, depending on the position in which they are arranged after the end of the installation, easily felt by the user and even cause irritability and/or unwanted injuries.

It is noted, therefore, that the current state of the art lacks zygomatic implants that have a forming that does not allow the part to be perceived when the user touches and/or presses the skin, but at the same time provides good installation conditions and adequate final stability.

Objectives of the Utility Model

The present utility model aims, therefore, to solve the disadvantages observed in zygomatic implants known in the current state of the art, especially regarding the fact that such implants interact directly with the soft tissues after the use of external installation technique, which can cause tissue irritation and/or inflammation and be noticeable when the user face is touched.

Therefore, it is one of the objectives of the present utility model to disclose a versatile zygomatic implant, since it can be used regardless of the installation status—external, embedded in the bone or internal to the maxillary sinus.

Additionally, it is one of the main objectives of the present utility model to provide a zygomatic implant that is smooth and devoid of a screw thread in a longitudinal section of its mid-cervical portion—more specifically in its body region that will eventually not be positioned inside bone structures after installation (i.e., it will be located externally to the maxillary sinus as seen in FIG. 1.2)—but that, even so, is capable of promoting the implant suitable stacking in the alveolar bone, thus guaranteeing the desirable installation primary stability.

It is also another of the present utility model objectives to disclose a zygomatic implant that is provided with a screw thread along its length, including in the longitudinal area opposite to said smooth longitudinal section.

Additionally, it is one of this utility model main objectives to provide means so that, at the end of the installation, the operator is able to position the zygomatic implant smooth portion facing the patient front (vestibular), in order to keep it further away from the soft tissues and thereby significantly reduce the chances of tissue irritation and/or inflammation, in addition to promoting less sensitivity to touch.

Finally, it is another of the present utility model objectives to provide means for the transition between the implant smooth portion and threaded position to be completely devoid of cutting edges, also aiming to improve the user comfort and safety during use.

Summary of the Utility Model

The present utility model, therefore, refers to a zygomatic implant having a partially interrupted threaded portion, which is defined by an elongated and cylindrical body 11 provided with a 111 screw thread; a conical apical region 12 with a surface provided with screw thread 121, said conical region apical 12 being provided with at least three helical chambers 13 and with a semi-spherical end 14; and a cervical region defined by a smooth cervical surface 15 whose edge is orthogonally attached to a perimeter and flat platform 16 that delimits the opening interspace of a prosthetic interface provided with at least one internal area with hexagonal cross section 18.

In a preferred embodiment of the present invention, the elongated and cylindrical body 11 comprises at least one longitudinal strip 112 having a substantially smooth surface, said smooth longitudinal strip 112 being located in the zygomatic implant 10 cervical portion; the connection between the threads 111 and the smooth longitudinal strip 112 is made by a transition curvature 113, and the smooth longitudinal strip 112 is aligned with one of the flat sides of the internal area with hexagonal cross section 18 of the implant 10 prosthetic interface.

Preferably, the smooth longitudinal strip 112 begins from the smooth cervical surface 15, and extends to the zygomatic implant 10 median region or, alternatively, said smooth longitudinal strip 112 extends and goes beyond the zygomatic implant 10 median region.

Also according to a preferential embodiment of the present utility model, the zygomatic implant 10 prosthetic interface comprises a frustoconical region 17 having a progressively reduced diameter of the platform 16 towards the implant apex, a hexagonal region 18, and a cylindrical region provided with an internal screw thread 19. Optionally, this prosthetic interface can comprise one of the following interfaces: morse taper, external hexagon or internal hexagon.

It should be noted that in the preferred embodiment now presented, the surface of the smooth longitudinal strip 112 is recessed at a distance r in relation to the screw thread 111 perimeter.

Additionally and still according to a preferred embodiment of the present utility model, there can be at least one marker means 151 placed on the zygomatic implant 10, said marker means 151 indicating the position of the flat side of the internal area with hexagonal cross section 18 of the implant 10 prosthetic interface corresponding to the positioning of the smooth longitudinal strip 112. It should be noted that the marker means 151 can be located in one of the following zygomatic implant 10 locations: prosthetic interface platform 16, smooth cervical surface 15, or frustoconical region 17, and comprises at least one among a color marking, an inscription, a protrusion or a recess.

Furthermore, preferably in the present zygomatic implant 10 apical region 12, the screw thread 121 $\alpha_1$ angle will be greater than the core $\alpha_2$ angle, while the screw thread 111 should be cylindrical and with ridges parallel to the cylindrical body 11 core longitudinal axis in which it is located. It should be noted that the apical region 12 screw thread 121 comprises substantially trapezoidal geometry (also known as reverse Buttress thread) having some tapered crest unique screw threads, while the cylindrical body 11 screw thread 111 comprises trapezoidal geometry.

BRIEF DESCRIPTION OF THE DRAWINGS

The present utility model will be described in more detail below based on an example embodiment represented in the appended figures, which show:

FIGS. 1.1 and 1.2—representations of the internal structures of the face showing the zygomatic bone, the maxillary sinuses' cavities and the maxillary bone in which a multiple prosthesis (protocol; see FIG. 1.1) is properly installed with the aid of current state of the art zygomatic implants;

FIG. 10.2—a lateral view of the apical portion of the zygomatic implant shown in FIG. 6, emphasizing the angle difference between the implant core and its thread;

FIG. 11—an enlarged detail view of the now presented zygomatic implant cervical end;

FIG. 12—a lateral view in enlarged detail of the present utility model zygomatic implant core, allowing to observe its smooth region forming as a result of the partially interrupted screw thread;

DETAILED DESCRIPTION OF THE UTILITY MODEL

The object of the present utility model will be described and explained in more detail based on the appended drawings, which are merely exemplary and not limiting, since adaptations and modifications can be made without changing the scope of the claimed protection.

As already mentioned, FIGS. 1 to 5 show current state of the art zygomatic implants, which are presented in the section "Related art", at the beginning of the present specification.

Figure 6:
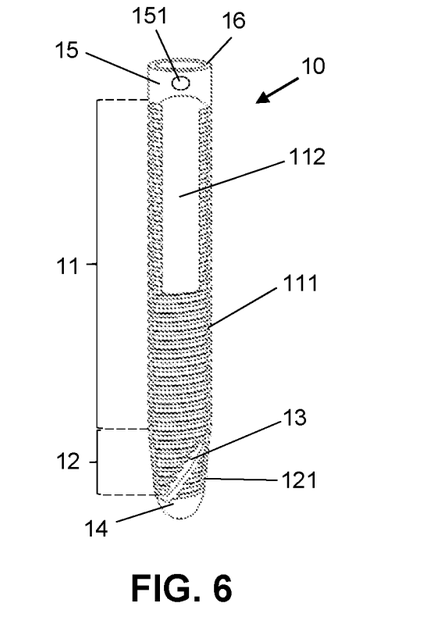
FIG. 6—a perspective view of a preferred embodiment of the zygomatic implant with partially interrupted threaded portion—object of the present utility model.

FIG. 6 illustrates a preferred embodiment of the present utility model zygomatic implant 10, which is defined by:
an elongated and cylindrical body 11;
a conical apical region 12 coated by a screw thread 121, said conical apical region 12 being provided with at least three helical chambers 13 and a semi-spherical end 14; and
a cervical end defined by a smooth surface 15 finishing in perimeter and flat platform 16 that adds the straight interface feature to the implant.

The elongated and cylindrical body 11 is also provided with screw thread 111, except in a longitudinal strip 112 which has a substantially smooth surface—that is, through which no unique screw thread 111 pass, since they are interrupted on that region periphery. It should be noted that in the illustrative drawings accompanying the present application, the preferred embodiment of the zygomatic implant 10 was represented containing only a smooth longitudinal strip 112, but the PHOSITAs will realize that it will obviously be possible to use at least one more smooth strip on the body, in a symmetrical position to the strip 112, as long as the final objective of solving the drawbacks of the current state of the art is maintained.

Figure 13:
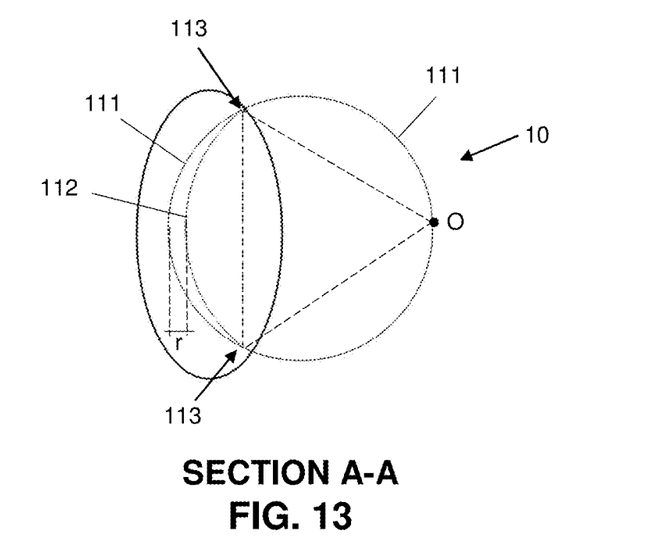
FIGS. 13 and 14—respectively show cross sections along line A-A in FIG. 9 and along line B-B of FIG. 5 of the present utility model zygomatic implant (FIG. 13) and the WO2011/063958 current state of the art implant (FIG. 14), respectively, allowing to compare the transition difference between the smooth and threaded regions of the two versions.
Figure 15:
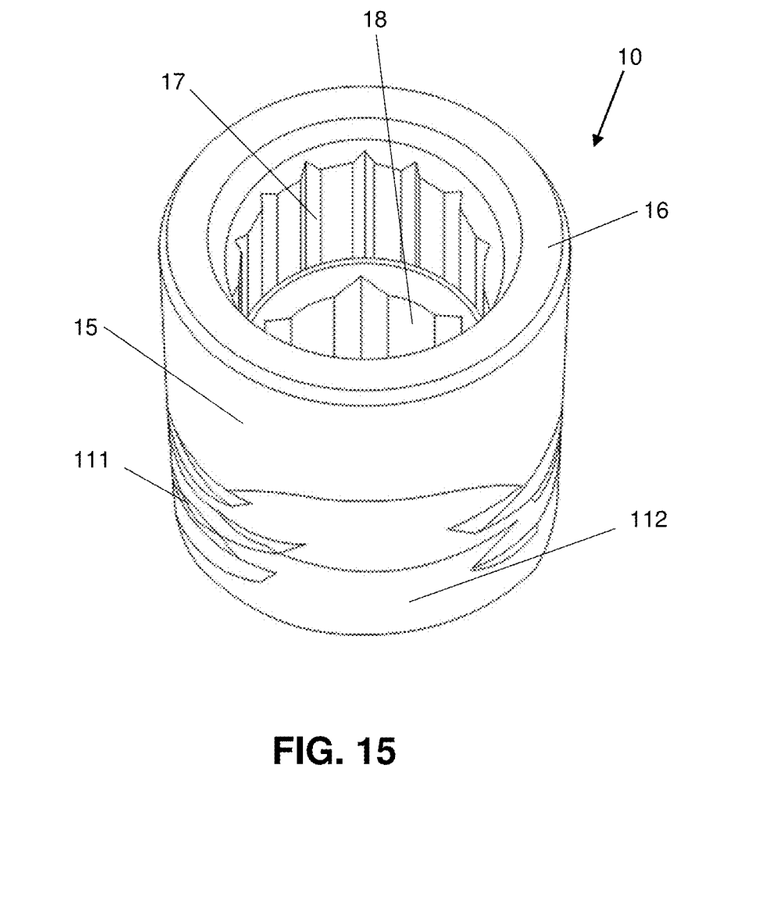
FIG. 15—shows an enlarged detail of the cervical portion of the zygomatic implant object of this utility model application.

In this respect, it should be clarified that the screw threads 111—which will be double, showing a trapezoidal profile—are smoothly interrupted, that is, through a transition curvature 113, so that there are no cutting corners and cutting edges between the smooth longitudinal strip 112 and the portion provided with a screw thread 111, as can be seen in appended FIGS. 13 and 15. Furthermore, preferably this longitudinal strip 112 radius is 2.5 mm with axis biased in relation to the implant 10 axis, which keeps the longitudinal strip 112 surface recessed at a distance r in relation to the screw threads 111 perimeter and therefore, further away from the patient face internal tissues.

Figure 14:
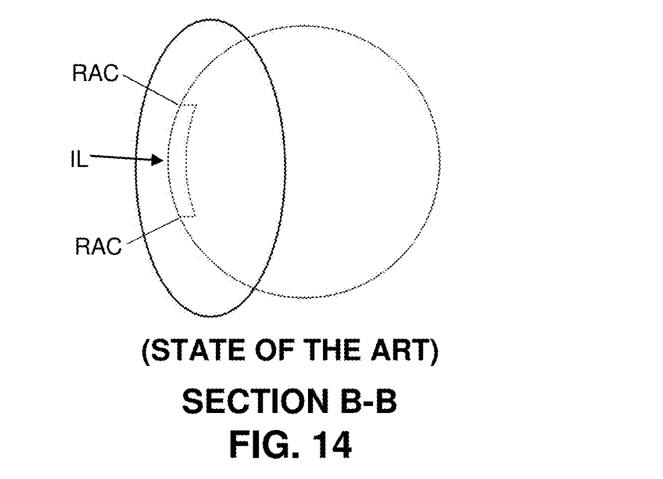

The performance of a comparative analysis between FIGS. 13 and 14 allows to clearly observe how the interruption of the state of the art screw threads generates piercing and cutting tips (RAC), while the interruption of the present proposal screw threads is done gradually and, therefore, without the presence of sharp and/or blunt vertexes. Furthermore, it is possible to observe that the form of interruption of the state of the art screw threads maintains practically the same perimeter area as the rest of the implant, whereas in the zygomatic implant now presented, this area is significantly reduced and recessed, thereby distancing the smooth longitudinal strip 112 from the soft tissues of the face of the user as explained above.

It is important to highlight that, in the example drawings accompanying this specification, said smooth longitudinal strip 112 starts right after the implant 10 smooth cervical surface 15. However, the PHOSITAs will understand that such smooth longitudinal strip 112 may extend in length and go beyond the implant 10 median region, or is located only in the cervical portion thereof, but away from the smooth cervical surface 15. Such positions do not interfere with the implant 10 suitable anchoring conditions, since its effective interaction with the patient bone regions will already have been guaranteed by the conical apical region 12 screw threads 121 and the cylindrical body 11 initial unique screw thread 111 contiguous to the apical region 12.

Said zygomatic implant 10 end smooth cervical surface 15 ends on a perimeter and preferably orthogonal to its surface platform 16. Such perimeter platform 16 delimits the prosthetic interface opening interspace, which has a longitudinal axis coinciding with the implant axial axis, according to the drawing of appended FIGS. 7 and 15. From the platform 16 towards the apical region, such prosthetic interface is defined by: a frustoconical region 17 whose diameter is progressively reduced from the platform 16 towards the implant apex; a hexagonal region 18; and a cylindrical region provided with an internal thread 19 for coupling and fixation the suitable prosthetic component (not shown).

It should be clarified that the preferred prosthetic interface described above is exemplary and can be replaced by any other type of interface known in the current state of the art, such as, for example, morse taper, external hexagon or internal hexagon, without escaping the herein claimed protection scope.

Figure 7:
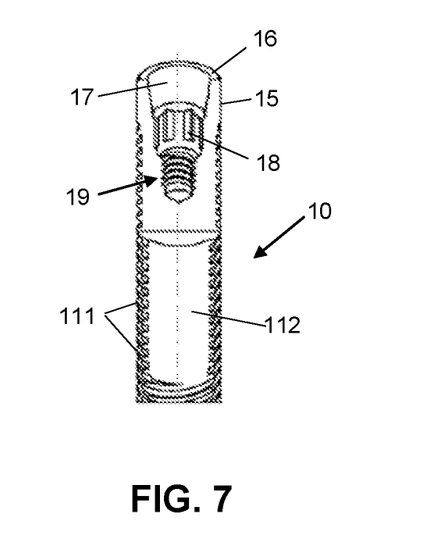
FIG. 7—an enlarged and partially sectioned detail of the zygomatic implant cervical portion shown in FIG. 6, allowing to observe the alignment between the internal hexagon of the coupling interface and the region with partially interrupted screw thread.
Figure 8:
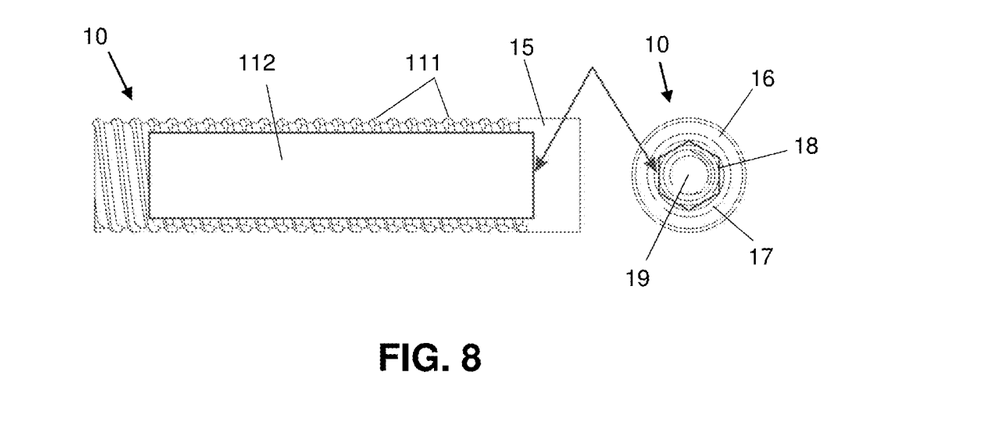
FIG. 8—shows a lateral view of the zygomatic implant body's cervical region of FIG. 6 in which the partially interrupted screw thread is located, in total alignment and projection in relation to a top view that allows to observe the part cervical end internal portion.

FIGS. 7 and 8 show that the implant 10 longitudinal strip 112 is aligned/indexed to one of the straight sides of the prosthetic interface hexagonal region 18, in order to allow the installer, at the end of the installation, to place the implant in a way as to leave the longitudinal strip 112 devoid of screw thread turned to the patient vestibular, in order to prevent inconveniences and discomforts previously described and, consequently, to improve use in relation to similar ones known in the current state of the art. As is known, with the use in current state of the art zygomatic implants, the user is able to feel the part screw threads upon any pressure applied to his face, which can cause discomfort, irritation and bad impression. In the case of implants having a cutting interruption in the screw thread, such as the one disclosed in document WO2011/063958 (whose cross section is shown in the appended FIG. 14), there is an aggravation that the blunt edges of the screw threads —which are formed at the interruption location—can cause injuries to the internal area of the face section that covers the maxillary sinus region during possible more intense external pressures. Therefore, the configuration presented herein aims to ensure that, after implant installing, the user is not at risk of internal injuries or feels discomfort during any pressure applied to his face. Additionally, with the configuration disclosed herein, a recess r is created on the implant surface 10 which will be facing the vestibular of the user, which keeps it in a "deeper" position when compared to conventional implants—and, consequently, inaccessible to softer pressures on the face.

The identification of the face of the hexagonal region 18 which is indexed to the smooth longitudinal strip 112 can be done by associating the already installed implant visualization (remembering that the zygomatic implants' installation process foresees the previous opening of a interspace for visualizing the maxillary sinus) with the use of a hexagonal installation driver (not shown) provided with marker means 151 (shown in FIG. 6) in positions corresponding to the straight sides by simply positioning the marker means 151 corresponding to the hexagon 18 side which is aligned/indexed to the implant 10 smooth longitudinal strip 112 for the patient vestibular.

Optionally the hexagonal region 18 side which is indexed with the smooth longitudinal strip 112 can be identified on the implant 10 itself by means of any marker 151 which, for example, can be a color marking, an inscription, a protrusion or a recess, and such a marker means 151 can be located on the platform 16, on the smooth cervical surface 15, or in the frustoconical region 17 of the prosthetic interface.

Figure 9:
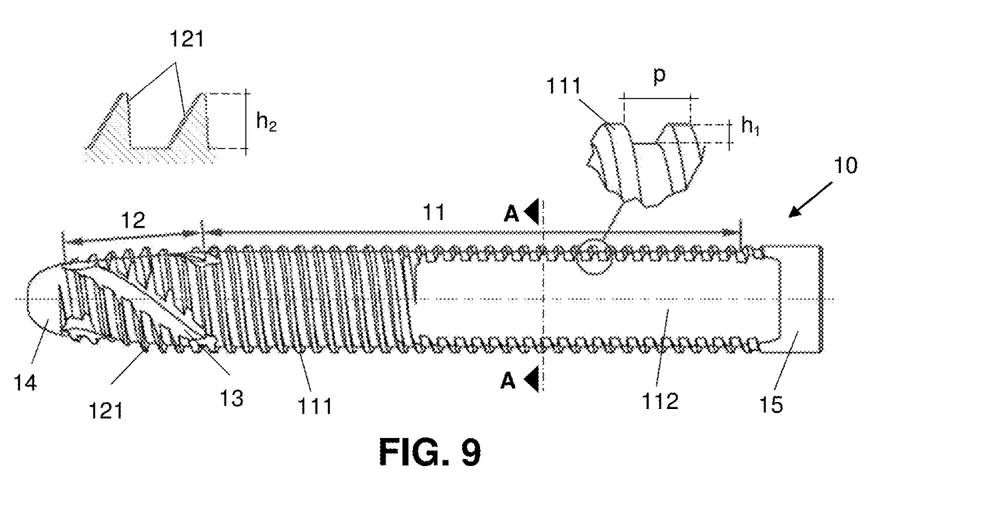
FIG. 9—a lateral view of the object of the present utility model, with enlarged details of the screw threads existing in its apical and cervical portions, FIG. 10.1—a bottom view showing the apical end of the zygomatic implant object of the present utility model.

The zygomatic implant 10 it can be produced in any diameter suitable to the part use function, being that, in the preferred embodiment presented herein, this diameter measures 4.0 mm. Additionally, its external screw thread 111, which has two entrances on the right next to the smooth cervical surface 15, preferably has a trapezoidal profile as can be seen in the appended FIG. 9 (that is, it does not have a cutting feature), and in the cylindrical body portion 11 the unique screw thread 111 height h1 preferably will be of 0.20 mm. The apical region 12 screw thread 121 will also have substantially trapezoidal geometry (also known as a reverse Buttress thread), and may have some unique screw threads with a more tapered crest than the others, as shown in the enlarged detail of FIG. 9, in order to better penetrate the bone during installation.

Figure 101:
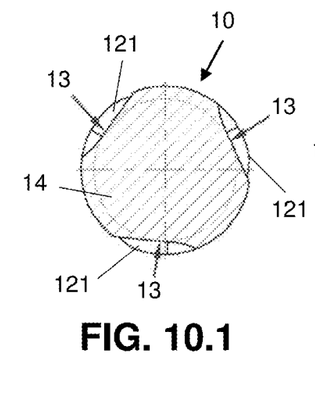

As previously mentioned, the apical region 12 has a substantially tapered profile, showing a semi-spherical end 14 and three helical chambers 13 equally distributed in its perimeter (see FIG. 10.1). Additionally, this apical region 12 screw thread 121 has a progressive increase in depth or height h2 —which preferably will reach a maximum value of 0.4 mm—in the cervical direction.

Figure 102:
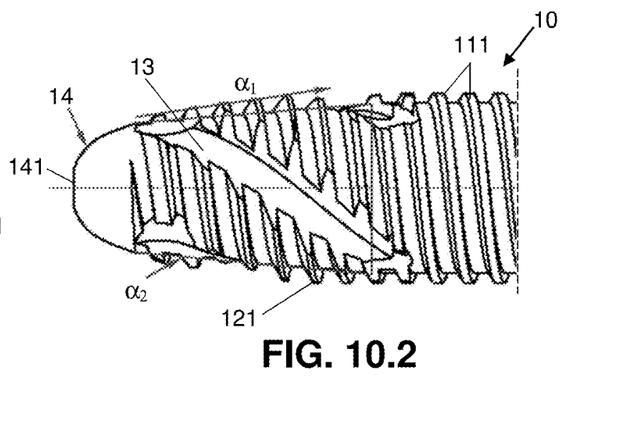

Furthermore, in the appended FIG. 10.2 it is possible to notice that the screw thread 121 angle $\alpha_1$ is more pronounced than the implant core angle $\alpha_2$ in the apical region 12, this forming being intended to assist in the insertion and interaction of the part with the zygomatic bone. Therefore, the combination of conical apical profile with semi-spherical end 14, helical chambers 13 and progressive increase in the screw thread 121 depth h2 contribute to the promotion of appropriate apical anchorage and, consequently, to the implant primary stability.

Due to the fact that it is an implant for fixation on the zygomatic bone, it can be manufactured in a wide range of lengths, for example, 30.0/35.0/37.5/40.0/42.5/45.0/47.5/50.0/52.5 and 55.0 mm, preferably in Pure Titanium Grade 4 (according to ASTM F67 Standard "Unalloyed Titanium, for Surgical Implant Applications") and, alternatively, using other manufacturing materials such as Zirconia or biocompatible polymeric materials. Additionally, the implant 10 may optionally present differentiated geometry in the semi-spherical end 14 central region 141 according to the example shown in FIG. 10.2, to allow the part suitable coupling to the packaging that will contain it—it should be noted that in the preferred embodiment illustrated in the indicated drawing, the central region 141 it is flat, but it can present other features according to the demand of the packaging to be used.

The body 11 smooth longitudinal strip 112 should, in the preferred embodiment herein presented, be initiated at a distance d1 of 1.60 mm and end at a distance d2 between 16.0 and 16.5 mm from the implant 10 platform 16, according to the appended FIG. 12 (which shows only the body 11 core, without the screw threads 111). The screw thread 111, complementing the cervical region, must end at a distance d3 of preferably 2.0 mm from the platform 16, with screw thread pitch P around 0.65 mm (see FIG. 9).

It is important to note that it will eventually be necessary to perform an additional movement in the torque or counter torque direction in order to position said smooth longitudinal strip 112 in the desired position—that is, facing the patient vestibular position. Considering that the most unfavorable positioning would occur when the point O shown in the section of FIG. 13 was facing toward the vestibular at the end of the installation, in the worst case it would be necessary to exercise a complementary half-turn movement to properly position the longitudinal strip 112 for the patient vestibular.

Therefore, using the preferential value of 0.65 mm for the screw thread pitch P, and since said implant will preferably be produced with a double screw thread, at each 360 degree rotation of the implant the lead will be 1.30 mm. Thus, in the worst case, at the end of the installation it will be necessary to exert a half rotation complementary torque or counter torque, resulting, in the now considered example, in a maximum complementary displacement of 0.65 mm. Therefore, the maximum displacement value required for positioning the longitudinal strip 112 in the patient vestibular position corresponds to half of the implant lead.

The manufacturing of the implant 10 object of the present utility model—which consists of the operations of (i) raw material dimensional transformation, (ii) machining, (iii) cleaning and (iv) packaging—demands the use of a lateral milling cutter (not shown) to ensure geometry in the longitudinal strip 112 devoid of screw threads, and this tool should be able to repeat a transition profile in curve 113 between the longitudinal strip 112 and the unique screw threads 111 as shown in FIG. 13.

For the use of the zygomatic implant 10, after properly preparing the installation site—which includes opening an interspace that allows the visualization of the maxillary sinus and, consequently, the implant itself to be installed—the operator must remove the implant from its packaging with the help of torque driver that is coupled to its prosthetic interface, an action that will automatically position one of the marking elements of the driver in a position corresponding to that of the hexagonal region 18 side which is aligned with the smooth longitudinal strip 112. Next, the implant is positioned 10 in the previously formed orifice with the aid of suitable drills, initiating the torque application to promote the implant insertion.

At this point, it is important to clarify that during the entire implant installation, it will be necessary to rotate it, even when the part with partially interrupted screw thread is inserted into the maxillary bone. This is due to the existence of the screw thread 111 in the region posterior to that in which the smooth longitudinal strip 112 is located (note that with the use of implants known in the current state of the art, the portion devoid of screw thread is located throughout the implant perimeter, so that for its installation it is enough for the operator to just slide this area through the orifice already formed in the bone). The zygomatic implant 10 external forming herein presented ensures that it remains aligned with the installation axial axis during the entire procedure, therefore without the possibility of unwanted misalignments—which facilitates the operation, in addition to guaranteeing the perfect positioning for placement of the planned prosthesis.

At the end of the installation—that is, after the implant 10 apical end is attached to the zygomatic bone and its entire body has already been inserted into the patient maxilla until the platform 16 faces the alveolar ridge—the operator must position the implant with a smooth longitudinal strip 112 facing the vestibular, which is done through the joint visualization of the implant 10 position with the position of the existing visual marker means 151 on the installation driver—that is, the implant 10 is slightly further screwed clockwise or counterclockwise until the suitable marker means 151 on the installation driver points to the patient vestibular, thereby making it so that the smooth longitudinal strip 112 also faces the vestibular. After this process is finished, the chosen prosthetic component and, subsequently, the prosthesis can be simply attached to complete the patient maxillary dental rehabilitation procedure.

Having described a preferred embodiment example, it should be understood that the scope of the present invention covers other possible variations and is limited only by the content of the appended claims, including possible equivalents thereof.

The invention claimed is:

1. A zygomatic implant having a partially interrupted threaded portion, said implant comprising:

an elongated and cylindrical body region including a first screw thread that is a double screw thread on an outer surface of the elongated and cylindrical body region;

a conical apical region including a surface provided with a second screw thread, the conical apical region comprising at least three helical chambers and a semispherical end; and a cervical region defined by a smooth cervical surface, an edge of the smooth cervical surface being orthogonally attached to a perimeter and flat platform that delimits an opening interspace of a prosthetic interface including at least one internal area with a hexagonal cross section, wherein:

the elongated and cylindrical body region comprises at least one longitudinal strip having a substantially smooth surface, the smooth longitudinal strip extends from the smooth cervical surface of the cervical region in an axial direction of the zygomatic implant;

the first screw thread includes threads that extend in a circumferential direction partially around the elongated and cylindrical body region between thread ends that are arranged on opposite sides of the smooth longitudinal strip in the circumferential direction;

the thread ends of the first screw thread transition into the smooth longitudinal strip through a smooth transition curvature that is devoid of cutting edges;

the smooth longitudinal strip is curved in the circumferential direction between the thread ends of the first screw thread; and the smooth longitudinal strip is aligned with a flat side of the internal area with the hexagonal cross section of the prosthetic interface.

2. The zygomatic implant according to claim 1, wherein the smooth longitudinal strip starts from the smooth cervical surface and extends to a median region of the zygomatic implant.

3. The zygomatic implant according to claim 1, wherein the smooth longitudinal strip extends through and goes beyond a median region of the zygomatic implant.

4. The zygomatic implant according to claim 1, wherein the prosthetic interface comprises:

a frustoconical region having a progressively reduced diameter from the flat platform towards an apex of the zygomatic implant;

the at least one internal area with the hexagonal cross section; and a cylindrical region provided with an internal thread.

5. The zygomatic implant according to claim 1, wherein the prosthetic interface comprises one of the following interfaces: morse taper, external hexagon or internal hexagon.

6. The zygomatic implant according to claim 1, wherein an outer surface of the smooth longitudinal strip is recessed at a distance (r) in relation to an outer perimeter of the first screw thread.

7. The zygomatic implant according to claim 1, further comprising at least one marker arranged in the zygomatic implant, the marker indicating a position of the flat side of the internal area with the hexagonal cross section of the prosthetic interface corresponding to a position of the smooth longitudinal strip.

8. The zygomatic implant according to claim 7, wherein the marker is located in one of the following zygomatic implant locations: the flat platform, the smooth cervical surface, or a frustoconical region.

9. The zygomatic implant according to claim 7, wherein the marker comprises at least one of a color marker, an inscription, a protrusion or a recess.

10. The zygomatic implant according to claim 1, wherein the second screw thread comprises a screw thread angle ($\alpha_1$) greater than a core angle ($\alpha_2$) of the conical apical region, while the first screw thread is parallel to the elongated and cylindrical body region on which the first screw thread is located.

11. The zygomatic implant according to claim 1, wherein the second screw thread of the conical apical region comprises substantially trapezoidal geometry including various tapered crest screw threads, and the first screw thread of the elongated and cylindrical body region comprises a trapezoidal geometry.

12. The zygomatic implant according to claim 8, wherein the marker comprises at least one of a color marker, an inscription, a protrusion or a recess.

13. The zygomatic implant according to claim 1, wherein the first screw thread and the second screw thread are contiguous.

* * * * *